United States Patent Office.

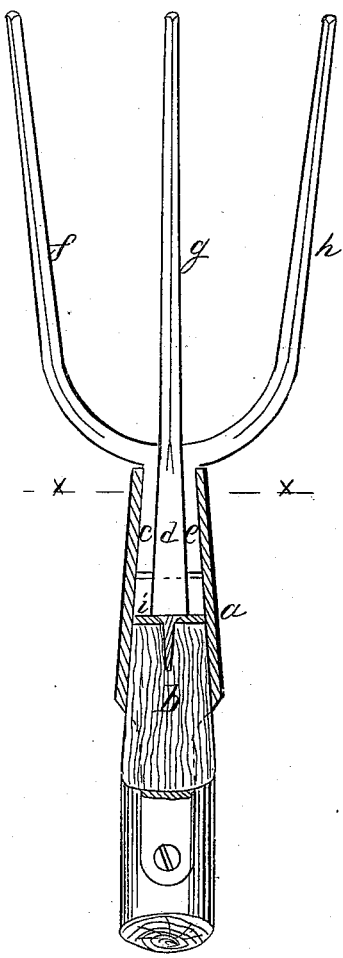

EDWIN MOORE, OF BROOKLYN, E. D., NEW YORK.

Letters Patent No. 92,989, dated July 27, 1869.

IMPROVEMENT IN HAY AND MANURE-FORKS.

The Schedule referred to in these Letters Patent and making part of the same.

To all whom it may concern:

Be it known that I, EDWIN MOORE, of Brooklyn, E. D., in the county of Kings, and State of New York, have invented and made an Improvement in Hay and Manure-Forks; and I do hereby declare the following to be a full, clear, and exact description of the said invention, reference being had to the annexed drawing, making part of this specification, wherein—

Figure 1 is a section of the end of the handle and the shank of the tines, and

Figure 2 is a cross-section, at the line $x$ $x$.

Hay and manure-forks have before been made with tines that could be removed. These tines, however, were inserted from outside the ferrule, and were not held in by the handle itself, but by a tine, passing in from the outside, or a wedge. In this case the pressure upon the handle, when the fork was in use, did not aid in tightening the tines.

The nature of my said invention consists in a fork with movable tines, the shanks of which tines are wider at the back end than toward the base of the tine itself, so that the shanks of said tines form wedges, that are driven forward in the ferrule, and tightened therein by the handle, against an end plate, upon which handle the ends of the shanks rest, whereby the strain to which the fork is subjected when in use tends to tighten the tines within the ferrule, and prevents them working loose.

In the drawing—

$a$ is a metal ferrule, forming a tapering socket, to receive the end of the wooden handle $b$, and at the end of the ferrule is a mortise, of the size and shape to receive the shanks $c$ $d$ $e$ of the tines $f$ $g$ $h$.

The shanks $c$ $d$ $e$ are all wedge-formed, and the shanks $c$ and $e$ are first introduced into the mortise at the end of the ferrule $b$, and then the straight, or nearly straight tine $g$ and its shank $d$ are introduced; said shank being of a wedge form on two sides, is driven firmly in between $c$ and $e$, so as to hold them in place.

At the end of the handle $b$ a shield, $i$, may be applied, to prevent the tine $g$ becoming loose, from being driven backward when in use.

It will be understood that the tines are kept into their mortise, in the socket $a$, by the end of the handle $b$, and that the force exerted upon the handle, when in use, is transmitted directly to the bases of the shanks of the tines, and the tendency, when in use, is to tighten the tines in the socket; hence, said tines will always remain firmly in their socket.

What I claim, and desire to secure by Letters Patent, is—

The movable tines, with shanks that are wider at their back end than toward the front part of the shanks, so as to be retained within the metal socket by the handle, in the manner set forth.

In witness whereof, I have hereunto set my signature, this 11th day of March, A. D. 1869.

EDWIN MOORE.

Witnesses:
CHAS. H. SMITH,
GEO. T. PINCKNEY.